United States Patent Office 3,644,653
Patented Feb. 22, 1972

3,644,653
FLAVOURED AND SCENTED PRODUCTS
Serge Tcheiltcheff, Vitry-sur-Seine, France, assignor to Rhone-Poulenc S.A., Paris, France
No Drawing. Filed Apr. 4, 1969, Ser. No. 813,743
Claims priority, application France, Apr. 5, 1968, 147,207
Int. Cl. A23l 1/22; A61k 7/00, 27/00
U.S. Cl. 424—358
3 Claims

ABSTRACT OF THE DISCLOSURE

N,N-dimethyl-2-ethyl-butyramide has a minty flavour and scent which renders it useful in foods, drinks, medicines, and toilet preparations.

---

The present invention relates to products having a minty flavour and/or scent.

The need for minty scents or flavours is known. In scent compositions, minty odours produce a valued sensation of freshness. In flavouring compositions, minty flavours are also irreplaceable whether the composition is a drink, confectionary product or dentifrice, to mention only a few particularly important applications.

Hitherto minty odours and flavours could only satisfactorily be obtained by the use of natural essences. Although menthol has been used for a long time for this purpose, its intensity and coarseness require that it only be used circumspectly.

Minty products have interesting biological properties: a certain eupneic effect, slightly antiseptic properties, a certain ability to repel insects, and a slight soothing ability on insect stings. Accordingly, minty products are found in many medicines and toilet preparations.

It has now been found, and it is this which forms the subject of the present invention, that N,N-dimethyl-2-ethyl-butyramide can be used as a flavour or scent for the production of overtones like those of natural mint. The invention accordingly provides perfume bases, flavouring compositions, perfumes, foods, drinks, medicines and toilet preparations comprising N,N-dimethyl-2-ethyl-butyramide in a proportion such as to confer a minty flavour or scent.

N,N-dimethyl-2-ethyl-butyramide has in fact a minty odour of an astonishingly natural character. It does not possess the sharpness of menthol, but still retains ample strength. Its overtone tends towards the odour of Pouillot mint and approaches that of the Italo-mitcham mints. It can thus be used either by itself or in preparations comprising a minty odour of flavour. In the composition in which it is incorporated it brings about an agreeable sensation of freshness on the skin. It has furthermore been found that it is remarkably safe physiologically. Its 50% lethal dose ($LD_{50}$) in mice is 490 mg./kg. administered intraveneously and 900 mg./kg. administered orally. Tests with animals have shown that it is well tolerated by the cardio-vascular, respiratory and neuro-vegetative systems. It does not exert any irritant effect on the skin of the mucous membranes. As a result of this it is at least as usable as natural mint essences.

It is a colourless liquid boiling at 54–58° C. under a pressure of 1 mm. of mercury. It is very soluble in water and in the common organic solvents. It performs particularly well in compositions into which it is incorporated because it is very resistant to the action of alkaline or acid reagents, as well as the action of light, and to aging.

As a result of these properties, N,N-dimethyl-2-ethyl-butyramide can be employed in the usual manner in all types of toilet preparations including perfumery compositions, soaps and soap-making products, beauty preparations, dentifrices, preparations for personal hygiene, shaving materials, e.g. after-shave lotions, and in drinks, e.g. liqueurs, foods, e.g. confectionary products, and medicines. The proportion required is practically the same as that of conventional mint essences but must, of course, be adapted to the desired olfactory of flavouring effect. It yields particularly valuable results in lotions in which a freshness effect is desired, for example in after-shave lotions.

N,N-dimethyl-2-ethyl-butyramide may be prepared by the method of Lukes et al. [coll. Czech. Chem. Comm. 25, 461 (1960); Chem. Abst. 54, 11,974 (1960)]. However the process described in the following example is new and preferred.

EXAMPLE 1

100 cm.³ of 10 N sodium hydroxide solution is added, with stirring, and whilst maintaining the temperature at 0° C., to a mixture of 130 cm.³ of an aqueous dimethylamine solution containing 350 g. of dimethylamine per litre and 250 cm.³ of diethyl ether, and this is followed after 15 minutes by a solution of 135 g. of 2-ethyl-butyryl chloride in 250 cm.³ of diethyl ether. Stirring is continued for 30 minutes, the temperature being maintained at 0° C. The ether layer is decanted and then dried over 25 g. of potassium carbonate. After filtering, and evaporating the diethyl ether, 134.5 g. of N,N-dimethyl-2-ethyl-butyramide are distilled (B.P. 75–77° C./2 mm. Hg) in a yield of 94%.

The following examples illustrate the use of this compound.

EXAMPLE 2

After-shave lotion

|  | G. |
|---|---|
| Aqueous sorbitol, 70% by weight | 12 |
| Propylene glycol | 14 |
| Glycerine | 10 |
| Boric acid | 20 |
| N,N-dimethyl-2-ethyl-butyramide | 10 |
| Distilled (or deionized) water | to 1000 |

EXAMPLE 3

Dentifrice perfume base

|  | Parts by weight |
|---|---|
| Clove oil | 10 |
| Rose oil | 5 |
| Ceylon cinnamon oil | 10 |
| Badian oil | 400 |
| N,N-dimethyl-2-ethyl-butyramide | 575 |

This composition is used at the rate of 3% in paste dentifrices of conventional formulation.

I claim:
1. A composition of matter comprising:
   (a) N,N-dimethyl-2-ethyl-butyramide, and
   (b) a medicine, food, beverage or toilet preparation, said N,N-dimethyl-2-ethyl-butyramide being present in an amount sufficient to confer a minty flavor or scent to said composition.
2. A toilet preparation according to claim 1 in the form of a dentifrice.
3. A toilet preparation according to claim 1 in the form of an after-shave lotion.

References Cited

Wilson et al.—Organic Chemistry in Pharmacy (1949), p. 130.

SAM ROSEN, Primary Examiner

U.S. Cl. X.R.

99—140 R, 252—522

UNITED STATES PATENT OFFICE
CERTIFICATE OF CORRECTION

Patent No. 3,644,653          Dated February 22, 1972

Inventor(s) Serge Tchelitcheff

It is certified that error appears in the above-identified patent and that said Letters Patent are hereby corrected as shown below:

Please correct the spelling of Inventor's surname to --Tchelitcheff--.

Signed and sealed this 1st day of August 1972.

(SEAL)
Attest:

EDWARD M. FLETCHER, JR.          ROBERT GOTTSCHALK
Attesting Officer                Commissioner of Patents